July 26, 1966     G. W. SMILEY ETAL     3,262,586
POWER-OPERATED DISTRIBUTOR FOR GRANULATED MATERIALS
Filed March 8, 1962     2 Sheets-Sheet 1
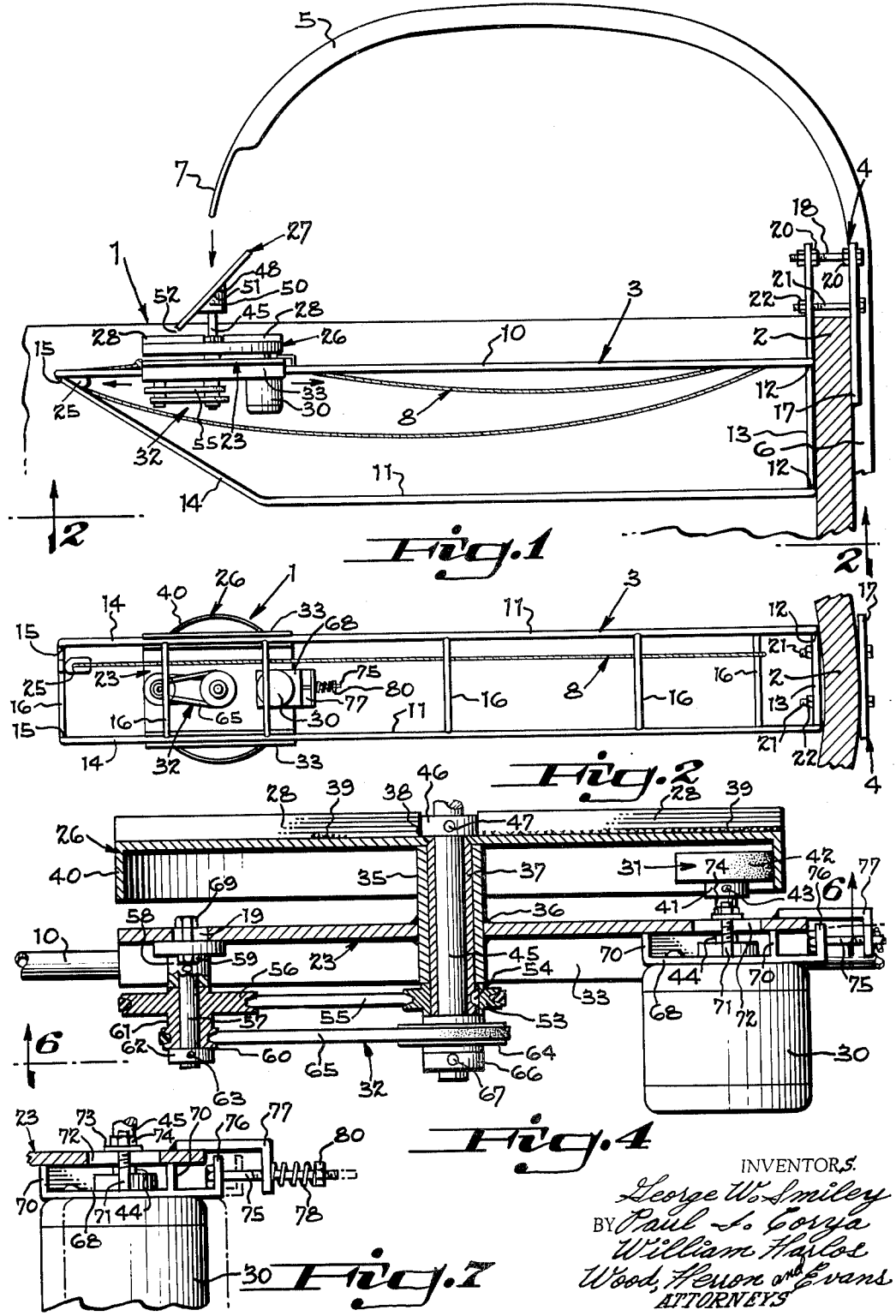
INVENTORS.
George W. Smiley
BY Paul L. Corya
William Harlos
Wood, Herron and Evans
ATTORNEYS

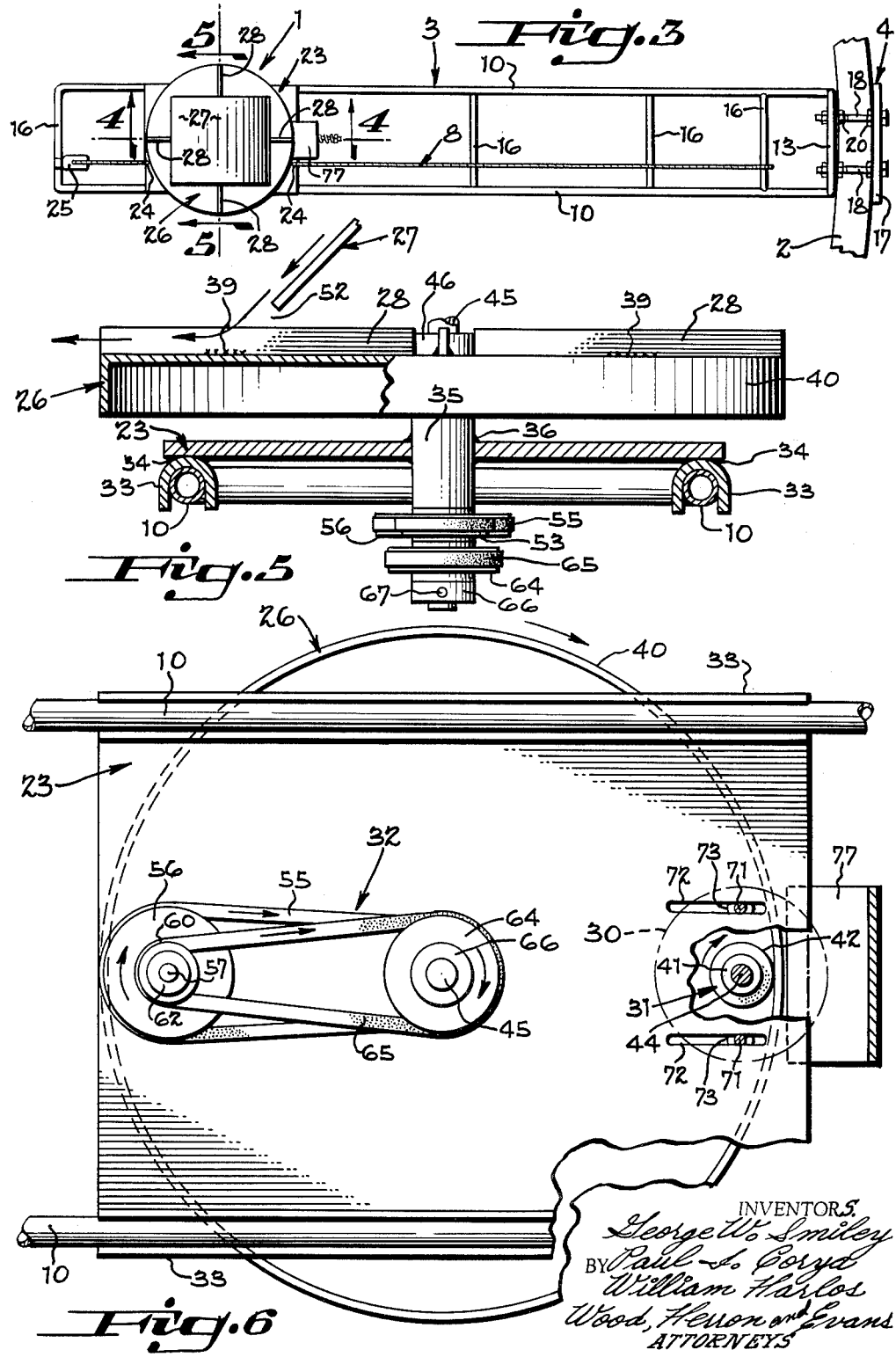

# United States Patent Office 3,262,586
Patented July 26, 1966

3,262,586
POWER-OPERATED DISTRIBUTOR FOR GRANULATED MATERIALS
George W. Smiley and Paul I. Corya, both of Rte. 4, Greensburg, Ind., and William Harlos, Rossville, Ind.; said Harlos assignor to said Smiley and said Corya
Filed Mar. 8, 1962, Ser. No. 178,344
10 Claims. (Cl. 214—17)

This invention relates to distributors of the type which are adapted to be mounted upon the upper portion of a silo or the like at a point at or near the central axis of the silo to spread or distribute a stream of silage, grain or similar granulated material which issues from a delivery conduit or horn. The word "silage," as used in this description, is intended to designate chopped silage, grain, and other granulated materials, particularly those which are stored in silos or other structures of this type.

In general, a conventional silo of the farm type, which illustrates the utility of the invention, comprises a cylindrical storage tower having an inside diameter which may vary considerably according to the feed storage requirements of a given farm. By way of example, the diameter of conventional silos may vary from 15 or 20 feet, up to 30 or more feet. The height of the silo also varies according to storage requirements, many silos being in the neighborhood of 60 feet in height.

In filling the silo, for example with corn silage, the maturing corn stalks, including the ears, usually are harvested from the fields and hauled to the silo. This material is then fed into a silage cutter, which chops the corn stalks and ears of corn into relatively small sized chips. After being chopped, the mixture is advanced through a blower which includes a blower pipe extending vertically along the outside of the silo, the arrangement being such that the blower generates a blast stream of air having sufficient velocity to carry the chips to the top of the silo. The upper end of the blower pipe conventionally includes a downwardly curved section or horn, which directs the blast stream of air and silage downwardly, such that the material falls by gravity into the silo to progressively fill it.

In order to spread the silage uniformly within the silo during the filling operation, it has been the conventional practice to manually shift the horn to various positions relative to the vertical center of the silo, or to provide other manual means for spreading the silage uniformly as it falls by gravity from the upper end of the horn. This is a disagreeable job since it requires at least one operator to work at the top or within the silo near the discharge end of the horn to direct the flow stream of silage.

One of the primary objectives of the present invention has been to provide an improved, power-driven silage spreader or distributor adapted to be mounted at the top portion of the silo in a position to intercept the downwardly directed blast stream of silage chips and air issuing from the discharge end of the horn and to cause the silage chips to drop by gravity in the form of a substantially uniform pattern. By virtue of the present structure, the accumulating mass of silage is kept substantially level in the silo during the filling operation in a reliable manner without the services of an operator at the top of the silo.

It has been a further objective of the present invention to provide a power-driven silage distributor of simple, light weight construction, which may be adjusted to provide efficient operation with respect to silos having various diameters, and which may also accommodate the distributor to the rate of flow of the silage from the horn and to other variable factors.

According to this aspect of the invention, the distributor comprises, in general, a throwing disk mounted for rotation in a horizontal plane about a vertical axis, a deflector plate mounted above the throwing disk for rotation about an axis which is common to the axis of rotation of the disk but which rotates at a substantially slower speed, and power means for driving the disk and deflector plate at a selected speed, independently of the rate of silage flow, thereby to provide the most efficient spreading action under various operating conditions. During the filling operation, the deflector plate intercepts the blast stream of silage chips issuing from the horn and directs the stream at an angle outwardly and downwardly to a series of upstanding vanes mounted upon the top surface of the throwing disk. The throwing disk rotates at a speed far greater than the speed of rotation of the deflector plate, and preferably in the same direction. By virtue of the rotary motion of the deflector plate, combined with the relatively high speed rotation of the throwing disk, the flow stream of silage from the deflector plate is intercepted by the vanes and is propelled outwardly in the form of a generally radial stream from the throwing disk. However, by reason of the rotary motion of the deflector plate, the flow stream of chips, as accelerated by the throwing disk, is projected outwardly in a path which moves continuously about the circumference of the silo to provide uniform distribution.

A further objective of the invention has been to provide a simplified driving system, whereby the throwing disk and deflector plate are both driven from a common source of power at related rates of speed, the throwing disk being driven at a speed sufficiently greater than the speed of the deflector plate to provide the necessary throwing action.

According to this aspect of the invention, the driving disk is rotated by means of a motor having a friction roller tracked against the periphery of the disk. The arrangement is such that the disk is rotated at a sufficient speed (for example at 225 r.p.m.), to propel the silage outwardly at the desired velocity. The deflector plate, which is mounted in an inclined plane above the throwing disk for rotation about the same vertical axis, is driven at a slower speed by a compound belt and pulley system which derives its power from the motor-driven disk. In order to rotate the throwing disk and deflector plate about a common axis of rotation, the disk is mounted upon a rotatable sleeve and the plate is mounted upon deflector plate shaft passing through and rotatably journalled in the sleeve of the throwing disk. The sleeve provides a driving connection from the power-operated disk to the pulley system, and the pulley system provides a reduction drive to the deflector shaft to rotate the shaft and deflector plate at a rate substantially less than the speed of rotation of the throwing disk. By way of example, the throwing disk may be rotated approximately at 225 r.p.m., while the pulley system drives the deflector plate preferably in the same direction at a rate of approximately 30 r.p.m., the speed reduction in this example being approximately 7½ to 1 from the throwing disk to the deflector plate. These related speeds of the disks and deflector plate may be varied by the use of a variable speed motor or by interchangeable friction rollers on the common drive motor to accommodate the distributor to various operating conditions, as noted earlier.

The various features and advantages of the invention will be more fully apparent to those skilled in the art from the following detailed description taken in connection with the drawings.

In the drawings:

FIGURE 1 is a fragmentary sectional view showing the upper portion of a silo with a silage distributor assembly mounted beneath the silage delivery conduit, illustrating in a general way the principles of the present invention.

FIGURE 2 illustrates the silage distributor assembly as viewed from beneath along the line 2—2 of FIGURE 1.

FIGURE 3 is a top plan view of the silage distributor assembly as projected from FIGURE 1, further illustrating the general arrangement of the structure.

FIGURE 4 is an enlarged fragmentary sectional view, taken along line 4—4 of FIGURE 3, detailing the driving system of the distributor unit.

FIGURE 5 is an enlarged cross sectional view, taken along the line 5—5 of FIGURE 3, further detailing the distributor unit.

FIGURE 6 is an enlarged fragmentary bottom view of the distributor unit, taken along line 6—6 of FIGURE 4. This view illustrates the use of a friction drive pulley which is smaller than the pulley shown in FIGURE 4, arranged to drive the throwing disk and deflector plate at a slower rate of speed.

FIGURE 7 is a fragmentary view taken from FIGURE 6, showing in full lines the position of the motor when adjusted to accommodate the high speed friction pulley of FIGURE 4 and showing in broken lines the adjustment of the motor to accommodate the low speed friction pulley shown in FIGURE 6.

*General arrangement*

As shown generally in FIGURES 1–3 a silage distributor unit, indicated generally at 1, which illustrates the principles of the present invention, is mounted upon the upper portion of a silo 2 by means of a cantilever bracket or frame structure, indicated generally at 3. The frame structure 3 projects in cantilever fashion from the cylindrical silo wall toward and beyond the central axis of the silo. The support frame structure 3 is detachably connected to the upper portion of the silo wall by a clamp structure indicated generally at 4.

The silage is conveyed to the distributor unit by a curved trough or horn 5, which communicates with a vertical blower pipe 6 extending along the outside surface of the silo. The blower pipe 6 communicates with a conventional silage cutter (not shown) which chops the silage material (such as corn stalks with ears of corn as harvested from the field) into relatively small sized chips. The silage cutter includes a blower which generates an air stream of sufficient velocity to carry the silage chips and particles upwardly through the blower pipe 6, then through the curved horn 5 and downwardly to the distributor unit 1, as indicated by the arrow in FIGURE 1.

As explained later in detail, the distributor unit 1 is adjustable along the frame structure 3 and is centered with respect to the silo. The discharge end 7 of the horn 5 is also centered with respect to the silo above the distributor unit. Accordingly, the distributor unit intercepts the downwardly directed blast stream of air and entrained silage chips and propels the chips outwardly in generally radial paths about the interior periphery of the silo. The distributing or spreading action brought about by the distributor unit 1, causes the silage chips to fall by gravity in a substantially uniform pattern across the entire area of the silo, such that the silage chips accumulate at a substantially level mass as the silo progressively is filled.

As explained later in detail, the frame structure 3 and the distributor unit 1 are adapted to be hoisted as separate unit from the ground to the top of the silo in order to facilitate installation. Thus, the frame structure 3 is first raised to its operating position and secured by its clamp 4 to the upper portion of the silo, as shown in FIGURE 1. After the frame 3 is secured firmly in place, the distributor unit 1 is elevated and placed in position on the frame structure 3 adjacent the wall portion of the silo. The distributor unit includes a base, as explained later, which establishes a slidable engagement with the frame structure. After being mounted on the frame, the silo unit is shifted outwardly along the frame structure 3 by means of a cable loop, indicated generally at 8 (FIGURE 1). The cable loop 8 is manipulated by the operator from a ladder or other support at the top of a silo wall, adapting the distributor unit to be shifted in a convenient manner along the frame structure to its operating position at the center of the silo, as indicated by the arrows in FIGURE 1. After having been centered, the cable loop is anchored to the frame structure to hold the distributor unit in its adjusted position.

It will be understood, at this point, that the conventional silo is cylindrical in shape and that the diameter of the silos will vary considerably from one farm to the next, depending upon storage requirements. On the other hand, the distributor unit, as noted above, should be located as nearly as possible at the center of the silo in order to provide uniform distribution. Accordingly, the frame structure 3 is made somewhat longer than one half the diameter of the largest silo for which it is intended, whereby the distributor unit may serve silos of smaller diameters through the adjustment provided by the cable loop 8. It will also be understood that each given size silo is provided with a curved silage delivery horn 5 having a length to dispose its discharge end 7 approximately at the center of the silo, adapting the distributor unit to be centered properly.

*Frame structure*

The frame structure 3 (FIGURES 1–3) preferably is fabricated of tubular metal stock suitably welded, comprising a pair of parallel upper support bars 10—10 and a pair of parallel lower bars 11—11 located in a horizontal plane below the upper bars. The inner ends of the pairs of bars 10 and 11 are joined by welding or the like as at 12 to the opposite sides of the vertical clamp plate 13 which rests against the inner surface of the silo wall. Clamp plate 13 forms a part of the clamp assembly, previously indicated at 4.

The outer end of the frame structure 3 includes a pair of angular brace bars 14—14. The brace bars 14 project upwardly from the respective lower bars 11 in an inclined plane (FIGURE 1) and are joined by welding or the like to the outer ends of the upper bars 10, as indicated at 15. The lower horizontal bars 11 are joined by transverse bars or struts 16, which preferably are welded in place to stiffen the frame structure transversely. As explained later in detail, the motor and driving system of the distributor unit 1 both depend downwardly below the plane of the upper support bars 10—10 of the frame structure. In order to avoid interferences as the distributor unit is shifted to its adjusted position along the bars 10, the transverse struts 16 are omitted from the upper support bars 10.

The clamp 4 of the frame structure includes a clamping plate 17 parallel with the clamp plate 13 (FIGURES 1 and 2) so as to provide a clamping engagement with the opposed surfaces of the silo wall. Both plates project upwardly above the top of the silo wall and include a pair of spacer bolts 18—18 passing through apertures formed in the clamp plates. Respective spacer nuts 20—20 are threaded upon the bolts 18 and engage the upper portions of the clamp plates to hold the plates in spaced relationship. Clamping pressure is applied to the clamping plates 13 and 17 by a pair of clamping bolts 21—21 passing through the clamping plates in a plane below the spacer bolts 18. Each clamping bolt 21 includes a nut 22, the nuts being tightened to draw the clamping plates firmly into engagement with the opposite surfaces of the silo wall.

The distributor unit 1 is supported upon a base plate indicated generally at 23, as described in detail later, and the cable loop 8 is connected to the base plate at the points indicated at 24—24 (FIGURE 3). The outer end of the cable loop 8 passes through a pulley 25 which is secured to the forward strut 16 (FIGURE 3) of the frame. The inner end of the loop passes about the rearward strut 16 adjacent the silo wall. It will be noted in this view, that the cable loop is located at one side of the distributor unit to avoid interference with its motor and driving system, which are located in a centered position straddled by the upper support bars 10—10. The cable loop 8 is shown in its slack condition in FIGURE 1 for shifting the distributor unit along the frame. As noted earlier, the cable loop is tightened and anchored to the rearward strut 16 about which it passes, so as to hold the distributor unit in its adjusted position.

*Distributor unit*

Described generally (FIGURES 4–6), the distributor unit comprises the base plate, previously indicated at 23, a throwing disk, indicated generally at 26 mounted for rotation upon the base plate 23, and a deflector plate indicated generally at 27 mounted for rotation upon an axis common to the axis of rotation of the throwing disk 26, but at a substantially slower rate. The throwing disk 26 is disposed in a horizontal plane while the deflector plate is disposed in an inclined plane above the throwing disk so as to intercept the downwardly directed blast stream of air and silage chips which issue from the discharge end 7 of the horn, as indicated by the arrow in FIGURE 1. Upon striking the surface of the deflector plate (FIGURE 5), the stream of silage follows a downwardly and outwardly inclined path, as delineated by the surface of the deflector plate 27, then strikes the upper surface of the throwing disk 26, as indicated by the arrows.

The upper surface of the throwing disk is provided with a series of upstanding radial vanes 28 (FIGURES 3 and 5), in the present example four in number, which extend outwardly to the periphery of the disk. These vanes, due to the speed of rotation of the disk, intercept and propel the silage outwardly by centrifugal force from the disk. Since the deflector plate is rotating relative to the throwing disk, the stream of silage is projected from the throwing disk in the form of a flow stream which rotates continuously about the periphery of the disk for uniform distribution.

As explained later in detail, the speed of rotation of the throwing disk is selected according to the diameter of the silo upon which it is installed. Generally speaking a relatively large silo will require a greater throwing disk speed than a smaller diameter silo in order to provide the proper spreading or distributing action. Moreover, the weight of the material and other variable factors also may require appropriate changes in disk speed for uniform distribution. As noted later, the disk is rotated by a motor 30 (FIGURE 4) having a friction roller 31 in direct driving connection with the periphery of the throwing disk 26. The motor may be of the variable speed type or it may be provided with interchangeable friction rollers 31 having different diameters in order to provide the required speed of disk rotation.

The deflector plate 27 is rotated preferably in the same direction as the disk but at a slower rate by means of a belt and pulley system, indicated generally at 32 (FIGURE 6). The arrangement is such that the motor 30 drives both the throwing disk 26 and the deflector plate 27 at related speeds. In the present example, the belt and pulley system provides a speed ratio of 7½ to 1 from the throwing disk to the deflector plate. Thus, by way of example, if a throwing disk speed in the neighborhood of 225 r.p.m. is selected, then the deflector plate will rotate at the rate of approximately 30 r.p.m. It will be understood that the selected throwing disk speed and related deflector plate speed may be higher or lower than this example as dictated by specific operating conditions.

Described in detail with reference to FIGURES 4–6, the base plate, previously indicated at 23, is provided with a pair of elongated mounting rails 33 secured by welding as at 34 along the opposite side edges of the mounting plate 23. The mounting rails 33 are of inverted U-shape in cross section (FIGURE 5) and slidably interfit the upper support bars 10 of the frame structure, adapting the distributor unit to be shifted longitudinally along the bars by the cable loop 8.

The throwing disk 26 and deflector plate 27 are both journalled for rotation about a common axis relative to the base plate. For this purpose, the base plate has a stationary bearing sleeve 35, which has a substantial length and which projects outwardly from opposite sides of the base plate for stability (FIGURES 4 and 5). The sleeve is welded as at 36 in an opening formed in the central portion of the base plate. The elongated sleeve 35 provides a rigid bearing capable of resisting the forces which act upon the deflector plate and throwing disk during operation of the machine.

The throwing disk 23 is journalled within the stationary sleeve 35 by means of a rotatable journal sleeve 37, extending downwardly from the center of the disk. The upper end of the journal sleeve 37 is preferably attached to the disk as at 38 by welding (FIGURE 4). The upper end of the stationary bearing sleeve 35 forms a thrust bearing engaging the lower surface of disk 26 to support the disk above the plane of the base plate 23. The journal sleeve 37 extends through and beyond the lower end of the stationary sleeve 35 and is interconnected with the belt and pulley system which rotates the deflector plate, as explained later.

In order to provide a driving connection between the power motor 30 and throwing disk 26 (FIGURE 4), the periphery of the disk 26 includes a cylindrical, downwardly depending skirt 40. The friction roller of the power motor, previously indicated at 31, includes a metal core having a mounting hub 41. The periphery of the core is provided with a tracking surface 42 formed of rubber or a similar material capable of providing the necessary frictional engagement with the skirt for driving the throwing disk. The hub 41 includes a set screw 43 which locks the hub to the shaft 44 of motor 30. The roller 31 thus provides a direct driving connection between the motor 30 and the cylindrical skirt 40, so that speed changes may be brought about by the use of interchangeable friction rollers 31. Thus, the roller shown in FIGURE 4 may represent a diameter for an intermediate speed, while the pulley 31 shown in FIGURE 6 may represent a diameter providing a lower disk speed. It will be noted that the overhanging skirt acts as a shield to prevent the silage from interfering with the driving connection provided by the friction roller 31.

The vanes, previously indicated at 28, preferably are in the form of metal bars rising from the upper surface of the throwing disk and welded thereto as at 39 (FIGURE 4). As viewed in FIGURE 3, the vanes preferably are disposed radially with respect to the axis of rotation of the throwing disk. The vanes extend from an area surrounding the axis of disk rotation to the outer periphery of the disk, as delineated by the skirt.

As noted earlier, the deflector plate 27 is mounted for rotation on a vertical axis which is common to the axis of rotation of the throwing disk 26. Thus, as viewed in FIGURE 4, the deflector plate is mounted upon the upper portion of a vertical drive shaft 45, which is rotatably journalled within the journal sleeve 37 of the throwing disk. In order to support the weight load of the deflector plate 27, the drive shaft 45 includes a collar 46 which is secured as at 47 to the drive shaft 45. The collar 46 is in bearing engagement with the top surface of disk 26 and thus acts as a thrust bearing with respect to shaft 45.

The deflector plate 27 preferably is rectangular in shape (FIGURE 3) and its lower surface includes a boss 48 which is secured as at 50 (FIGURE 1) to the upper portion of the drive shaft 45. The upper end of the boss 48 is disposed at an angle to the axis of the drive shaft 45, and the deflector plate is welded as at 51 to the top surface of the boss to support the plate for rotation about the vertical axis of the shaft, with the plate disposed at the indicated angle. The deflector plate is centered with respect to the drive shaft 45 with its lower edge spaced slightly above the upper edges of the vanes 28, as indicated at 52 in FIGURE 1.

As noted earlier, rotary motion is imparted to the deflector plate 27 by the belt and pulley system 32. For this purpose (FIGURE 4), the lower end of the rotatable journal sleeve 37, which forms a part of the throwing disk 26, includes a V-belt pulley 53 which is keyed as at 54 to the lower portion of sleeve 37. Pulley 53 provides the power source from the throwing disk 26, through the pulley system 32 and to the deflector plate 27, as explained in detail below.

Power is transmitted from pulley 53 by a V-belt 55 (FIGURE 4) to a driven pulley 56 which is rotatably journalled on an idler shaft 57. Idler shaft 57 is attached to and projects downwardly from a mounting boss 58 which is secured to the lower surface of the base plate 23. In order to provide adjustment for the belts and to permit the belts to be replaced, the boss 58 is secured to the base plate 23 by bolts 59 passing through slots 19 of the base plate 23 and clamped by nuts 69. The driven pulley 56 of idler shaft 57 includes a smaller pulley 60, the two pulleys being preferably of one-piece construction, joined by a hub 61. The pulleys are rotatably supported upon the idler shaft 57 by a collar 62 secured to the lower portion of shaft as at 63 to provide a thrust bearing. The small pulley 60 (FIGURE 4) is in driving connection with a deflector drive pulley 64 by means of a V-belt 65. Drive pulley 64 includes a hub 66 which is attached as at 67 to the lower portion of the deflector drive shaft 45.

From the foregoing, it will be observed that rotary motion is transmitted from the motor 30, to the throwing disk 26, and through its sleeve 37 to the pulley 53. From the pulley 53, power is transmitted by belt 55 to the large idler pulley 56 and to its companion small pulley 60. The second V-belt 65 drives pulley 64, which is keyed to the deflector shaft 45, so as to rotate the deflector 27. The direction of rotation of the several components of the driving system is indicated by the arrows in FIGURE 6. It will be understood that the relative diameters of the several pulleys provide the proper reduction ratio between the disk and deflector plate speeds of rotation. It will also be understood that this ratio may be altered if desired by substituting pulleys of different diameters in the driving system.

As noted earlier, the deflector plate 27 preferably rotates in the same direction as the throwing disk, such that the silage is accelerated in a somewhat progressive manner. Thus, as the silage issues from the discharge end of the horn 7, its direction of motion is directed in a path downwardly and outwardly by the deflector plate, and also in a circular direction, due to the rotary motion of the deflector plate. Upon discharging from the lower edge of the plate, the silage is accelerated in the same direction by the advancing vanes of the throwing disk.

In order to hold the friction roller 31 in tracking engagement with the skirt 40, as noted previously, the motor 30 is mounted for shifting motion with respect to the base plate 23. For this purpose (FIGURES 4, 6, and 7), the motor includes a shiftable mounting plate 68 having flanges 70 slidably engaged against the lower surface of the base plate 23. The mounting plate 68 includes a pair of studs 71 projecting upwardly through respective slots 72 formed in the base plate 23. Each stud includes a washer 73, with a nut 74 threaded on the stud above the washer. The washers slidably support the motor with respect to the base plate 23.

The roller 31 is frictionally engaged against the cylindrical skirt 40, by a stud 75 anchored as at 76 to the mounting plate 68 and slidably passing through an angle bracket 77 which is welded to the base plate 23 (FIGURES 4 and 7). A compression spring 78 encircles the stud 75 and is confined between the angle bracket 77 and a nut 80 threaded on the outer portion of stud 75. The compression spring 78 thus applies a constant pull to hold the friction roller 31 in tracking engagement with the skirt 40 as determined by the adjustment of nut 80.

Having described our invention, we claim:

1. A distributor for a silo or the like having means for delivering silage, grain, or similar material, said distributor adapted to be mounted beneath the delivery means to distribute the material relative to the silo, said distributor comprising a base member adapted to be mounted beneath said material delivery means, a throwing element mounted relative to said base member for rotation about a generally vertical axis, a deflector element mounted above the throwing element for rotary motion about a generally vertical axis relative to the base, said deflector element having a deflector surface leading downwardly toward the upper surface of the throwing element, a plurality of vane elements rising from the upper surface of the throwing element, and power means adapted to rotate said throwing element at a velocity sufficient to propel the material outwardly therefrom and to rotate the deflector element at a slower rate, said deflector element adapted to intercept and direct a flow stream of material downwardly and outwardly to the surface of the throwing element to be accelerated and propelled outwardly by the vane elements beyond the periphery of the throwing element, the rotating deflector element causing the flow stream of material to be projected outwardly from the throwing element in a path which moves continuously in a circle about the throwing element.

2. A distributor for a silo or the like, said silo having means for delivering silage, grain or similar granulated material, said distributor adapted to be mounted beneath the delivery means to distribute the material relative to the silo, said distributor comprising a base member adapted to be mounted beneath said delivery means, a throwing disk mounted upon said base member for rotation about a generally vertical axis, said throwing disk having a substantially flat upper surface disposed in a horizontal plane, a plurality of generally radial vanes rising from said upper surface of the said disk, a deflector element mounted above the throwing disk for rotary motion about a generally vertical axis common to the axis of rotation of the throwing disk, said deflector element having a deflector surface which is disposed in a downwardly inclined plane leading to the said vanes of the throwing disk, and power means in driving connection with the throwing disk and deflector element, said power means adapted to rotate said throwing disk at velocity sufficient to propel the material outwardly therefrom, and to rotate the deflector element at a slower rate, said deflector element adapted to intercept a flow stream of material and to direct the material downwardly and outwardly to the vanes of the throwing disk, to be intercepted and propelled outwardly by said vanes, the rotating deflector element causing the flow stream of material to be projected outwardly from the throwing disk in a path which moves continuously in a circle about the disk, thereby to provide a substantially uniform distribution of the material.

3. A distributor for a silo or the like, said silo having means for delivering silage, grain or similar granulated material, said distributor adapted to be mounted beneath the delivery means to distribute the material relative to the silo, said distributor comprising a base structure adapted to be mounted beneath said delivery means, a throwing disk mounted for rotation relative to the base structure about a generally vertical axis, a cylindrical skirt extending about the periphery of the throwing disk, a power motor mounted relative to the base structure, a friction roller connected to said motor for rotation about an axis parallel to the axis of rotation of the throwing disk, said friction roller being in frictional engagement with the surface of said cylindrical skirt for rotating the throwing disk at a velocity sufficient to propel the material outwardly therefrom, a deflector plate disposed above the throwing disk for rotation about an axis which is common to the axis of rotation of the throwing disk, and a driving system interconnecting the deflector plate and throwing disk, said driving system adapted to rotate said deflector plate at a rate substantially slower than the rate of rotation of the throwing disk, said deflector plate being mounted in a downwardly inclined plane and adapted to direct a stream of material downwardly and outwardly toward the upper surface of the throwing disk, the throwing disk being adapted to propel said flow stream outwardly, the rotary motion of the deflector plate adapted to project the material along a path which moves continuously in a circle about the disk to provide substantial uniform distribution of the material about the distributor.

4. A distributor for a silo or the like, said silo having means for delivering silage, grain or other granulated material, said distributor adapted to be mounted beneath the delivery means to distribute the material relative to the silo, said distributor comprising a base structure adapted to be mounted at the upper end of the silo beneath said delivery means, a throwing disk mounted for rotation above the base structure about a generally vertical axis, a cylindrical skirt depending downwardly from the throwing disk, a power motor mounted relative to the base structure, a friction roller connected to said motor for rotation about an axis parallel to the axis of rotation of the throwing disk, said friction roller being in frictional engagement with the inside surface of said cylindrical skirt, said power motor and friction roller providing a variable speed driving connection with the disk for rotating the disk at selected throwing speeds, a deflector plate disposed above the throwing disk for rotation about an axis which is common to the axis of rotation of the throwing disk, and a driving system interconnecting the deflector plate and throwing disk, said driving system adapted to rotate said deflector plate about said axis at a rate substantially slower than the rate of rotation of the disk, said deflector plate being mounted in a downwardly inclined plane and adapted to direct a stream of material downwardly and outwardly toward the upper surface of the throwing disk, the throwing disk being adapted to intercept and propel said flow stream outwardly, the rotary motion of the deflector plate adapted to project the material along a path which moves continuously in a circle about the disk to provide uniform distribution of the silage about the distributor.

5. A distributor for a silo or the like, said silo having means for delivering silage, grain or other granulated material, said distributor adapted to be mounted beneath the delivery means to distribute the material relative to the silo, said distributor comprising a base structure adapted to be mounted at the upper end of the silo beneath said delivery means, a throwing disk mounted for rotation above the base structure about a generally vertical axis in a horizontal plane, a cylindrical skirt depending downwardly from the throwing disk, a plurality of throwing vane elements, said vane elements extending outwardly along lines generally projecting from the top surface of the throwing disk, radial to the vertical axis of rotation of the disk, a power motor mounted relative to the base structure, a friction roller connected to said motor for rotation about an axis parallel to the axis of rotation of the throwing disk, said friction roller being in frictional tracking engagement with the inside surface of said cylindrical skirt, for rotating the throwing disk at a velocity sufficient to propel the material outwardly therefrom, a deflector plate disposed above the throwing disk for rotation about an axis which is common to the axis of rotation of the throwing disk, and a driving system interconnecting the deflector plate and throwing disk, said driving system adapted to rotate said deflector plate about said axis at a rate substantially slower then the rate of rotation of the disk, said deflector plate being mounted in a downwardly inclined plane and adapted to direct a stream of material downwardly and outwardly toward the upper surface of the throwing disk, the vane elements of the throwing disk being adapted to intercept and propel said flow stream outwardly, the rotary motion of the deflector plate adapted to project the material along a path which moves continuously in a circle about the disk to provide uniform distribution of the silage about the distributor.

6. A distributor for a silo or the like, said silo having means for deliverying silage, grain or other granulated material, said distributor adapted to be mounted beneath the delivery means to distribute the material relative to the silo, said distributor comprising a base structure adapted to be mounted at the upper end of the silo beneath said delivery means, a throwing disk mounted for rotation above the base structure about a generally vertical axis in a horizontal plane, a cylindrical skirt depending downwardly from the throwing disk, a plurality of throwing vane elements projecting from the top surface of the throwing disk, said vane elements extending outwardly along lines generally radial to the vertical axis of rotation of the disk, a power motor mounted relative to the base structure, a friction roller connected to said motor for rotation about an axis parallel to the axis of rotation of the throwing disk, said friction roller being in frictional tracking engagement with the inside surface of said cylindrical skirt, for rotating the throwing disk at a velocity sufficient to propel the material outwardly therefrom, a deflector plate disposed above the throwing disk for rotation about an axis which is common to the axis of rotation of the throwing disk, and a belt and pulley driving system interconnecting the deflector plate and throwing disk, said driving system comprising a drive pulley in driving connection with the throwing disk, a compound idler pulley mounted for rotation about an axis parallel to and displaced outwardly from the axis of rotation of the disk, a belt in driving connection between the drive pulley of the disk and the said compound pulley, a driven pulley in driving connection with the deflector plate, and a second belt in driving connection between the compound pulley and said driven pulley, said driving system adapted to rotate said deflector plate about said axis at a rate substantially slower then the rate of rotation of the disk, said deflector plate being mounted in a downwardly inclined plane and adapted to direct a stream of material downwardly and outwardly toward the upper surface of the throwing disk, the vane elements of the throwing disk being adapted to intercept and propel said flow stream outwardly, the rotary motion of the deflector plate adapted to project the material along a path which moves continuously in a circle about the disk to provide uniform distribution of the silage about the distributor.

7. A distributor for a silo or the like having means for delivering silage, grain or other granulated material, said distributor adapted to be mounted beneath the delivery means to distribute the material issuing from the delivery means, said distributor comprising a base member adapted to be mounted beneath said delivery means, bearing means mounted on said base member, a generally vertical journal sleeve rotatably journalled in said bearing means of the base member, a throwing disk mounted on said journal sleeve and disposed above the base member for rotation in a generally horizontal plane, a deflector shaft rotatably interfitting said journal sleeve, a deflector element mounted upon said deflector shaft and disposed above the throwing disk, said deflector element having a downwardly inclined surface including a lower edge residing above the throwing disk, a power motor in driving connection with said disk adapted to rotate the disk at a velocity sufficient to propel the material outwardly about the periphery of the disk, and a speed reduction system interconnecting the said journal sleeve with said deflector shaft, said speed reduction system adapted to rotate the deflector shaft and deflector element at a rate of rotation substantially slower than the rate of rotation of the throwing disk, whereby the deflector element is adapted to intercept and direct a flow stream of material at an angle outwardly and downwardly to the top surface of the throwing disk to be accelerated and propelled outwardly by the disk, the rotating deflector plate adapting the flow stream of silage to be projected outwardly in a path which moves continuously in a circle to provide substantially uniform distribution of the material about the throwing disk.

8. A distributor for uniformly distributing particulate material within a cylindrical storage structure of the type having delivery means for introducing particulate material in a stream at the upper end of the cylindrical storage structure, said distributor comprising a frame adapted to be mounted within said storage structure, a throwing disk mounted upon said frame for rotation about a vertical axis, a plurality of vane elements carried by and projecting upwardly from said throwing disc, power-operated driving means connected to said throwing disk for rotating said throwing disk at a rate sufficient to accelerate and propel outwardly particulate material dropped onto said throwing disk, a deflector member disposed above said throwing disk and below said delivery means for intercepting the stream of particulate material and for delivering the particulate material to said throwing disk, and means for rotating said deflector member about an axis concentric with the axis of rotation of the throwing disc at a speed different from the speed of the throwing disc, said deflector member being configurated to discharge particulate material by gravity over an area substantially less than the total area of said throwing disc, whereby particulate material drops from said deflector member onto progressively different portions of said throwing disc, said particulate material being propelled outwardly by said throwing disc and being substantially uniformly distributed within said cylindrical storage structure.

9. A distributor for uniformly distributing particulate material within a cylindrical storage structure of the type having delivery means for introducing particulate material in a stream at the upper end of the cylindrical storage structure, said distributor comprising a frame adapted to be mounted within said storage structure, a throwing disc mounted upon said frame for rotation about a vertical axis, a plurality of vane elements carried by and projecting upwardly from said throwing disc, power-operated driving means connected to said throwing disc for rotating said throwing disc at a rate sufficient to accelerate and propel outwardly particulate material dropped onto said throwing disc, a deflector member disposed above said throwing disc and below said delivery means for intercepting the stream of particulate material and for delivering the particulate material to said throwing disc, and means for rotating said deflector member about an axis concentric with the axis of rotation of the throwing disc at a speed slower than the speed of the throwing disc, said deflector member being configurated to discharge particulate material by gravity over an area substantially less than the total area of said throwing disc, whereby particulate material drops from said deflector member onto progressively different portions of said throwing disc, said particulate material being propelled outwardly by said throwing disc and being substantially uniformly distributed within said cylindrical storage structure.

10. A distributor for uniformly distributing particulate material within a cylindrical storage structure of the type having delivery means for introducing particulate material in a stream at the upper end of the cylindrical storage structure, said distributor comprising a frame adapted to be mounted within said storage structure, a throwing disc mounted upon said frame for rotation about a vertical axis, a plurality of vane elements carried by and projecting upwardly from said throwing disc, power-operated driving means mounted below said such throwing disc and connected to said throwing disc for rotating said throwing disc at a rate sufficient to accelerate and propel outwardly particulate material dropped onto said throwing disc, a deflector member disposed above said throwing disc and below said delivery means for intercepting the stream of particulate material and for delivering the particulate material to said throwing disc, and means for rotating said deflector member about an axis concentric with the axis of rotation of the throwing disc at a speed slower than the throwing disc, said deflector member having a deflector surface sloping downwardly toward said throwing element, whereby particulate material drops from said deflector member onto progressively different portions of said throwing disc, said particulate material being propelled outwardly by said throwing disc and being substantially uniformly distributed within said cylindrical storage structure.

References Cited by the Examiner

UNITED STATES PATENTS

| | | |
|---|---|---|
| 2,834,483 | 5/1958 | Friedman. |
| 2,860,790 | 11/1958 | Erickson et al. |
| 2,940,573 | 6/1960 | Schultz _____ 198—128 X |

FOREIGN PATENTS

| | | |
|---|---|---|
| 336,398 | 4/1921 | Germany. |
| 234,738 | 6/1925 | Great Britain. |

GERALD M. FORLENZA, *Primary Examiner.*

HUGO O. SCHULZ, ERNEST A. FALLER, *Examiners.*

R. SHERIDAN, *Assistant Examiner.*